March 26, 1929.   O. D. OLIVER   1,706,936
DUMP CAR DOOR
Filed Dec. 29, 1926   3 Sheets-Sheet 1
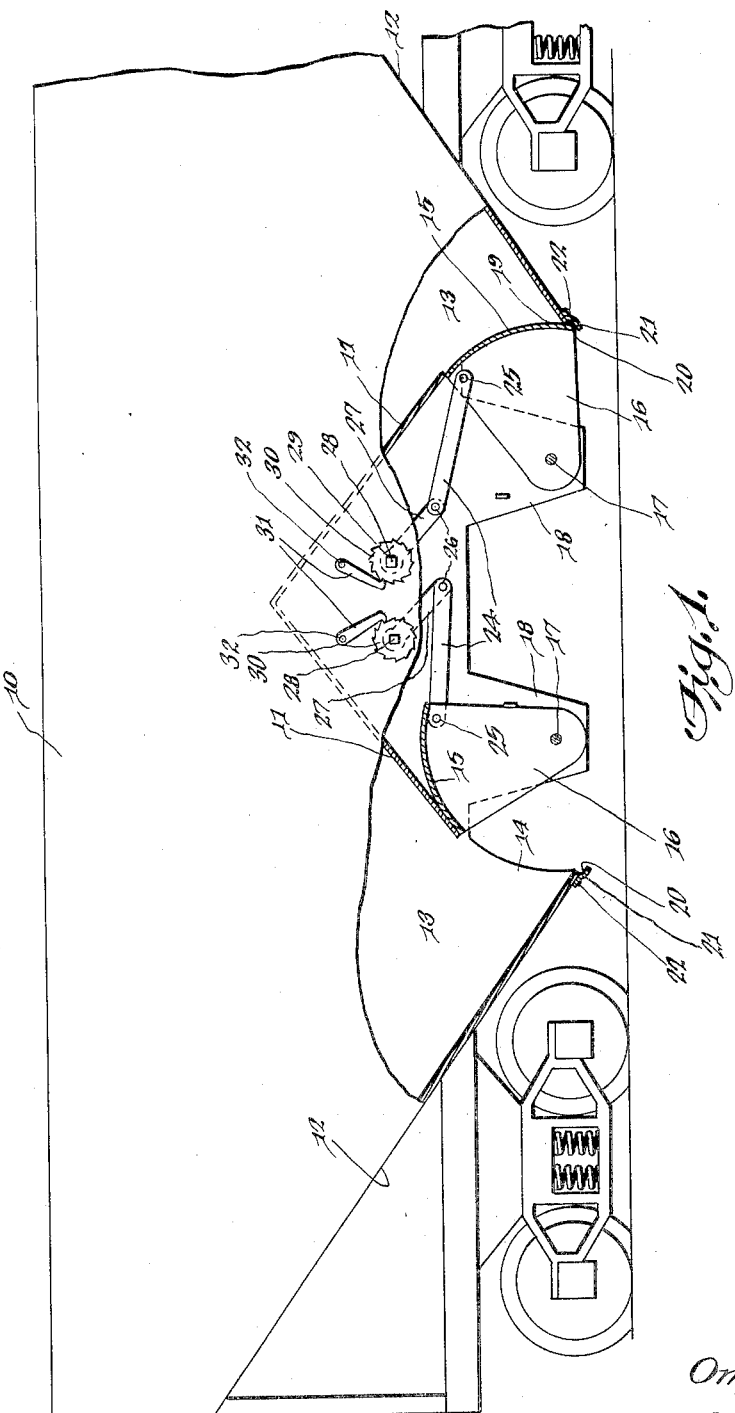
Omer D. Oliver
INVENTOR
BY Victor J. Evans
ATTORNEY

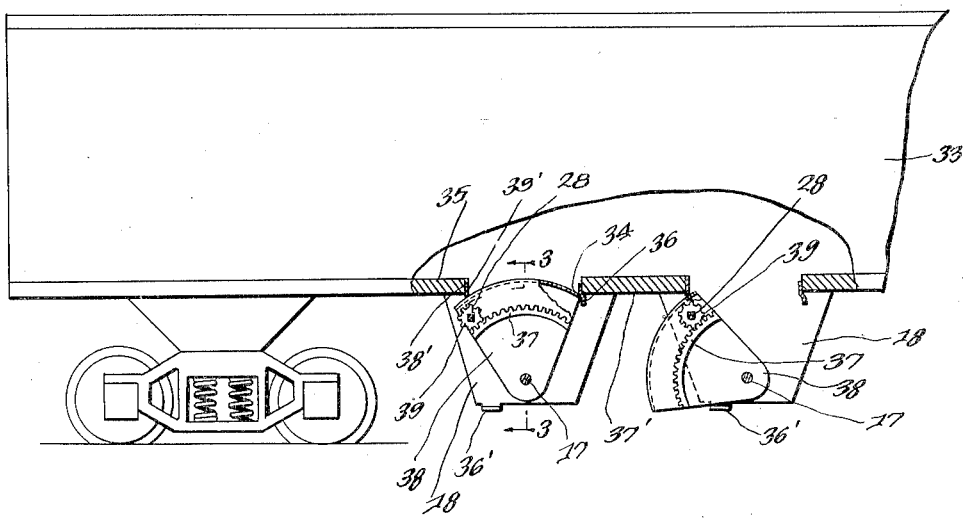
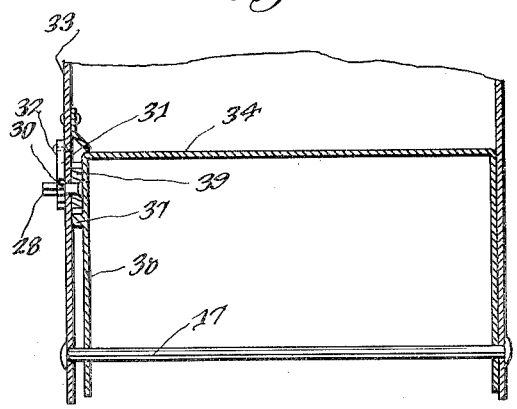
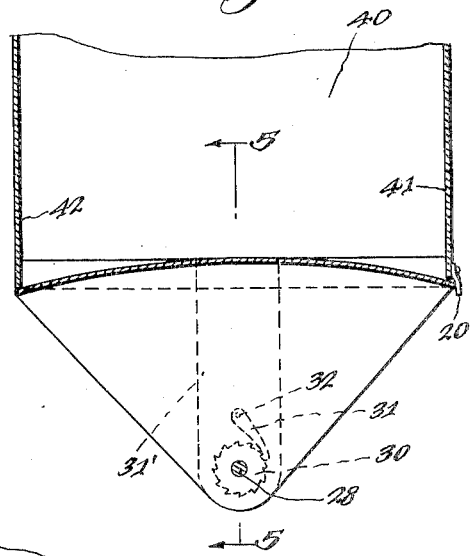
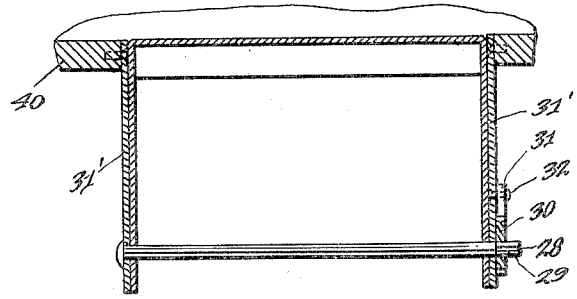

March 26, 1929.　　　O. D. OLIVER　　　1,706,936
DUMP CAR DOOR
Filed Dec. 29, 1926　　　3 Sheets-Sheet 3
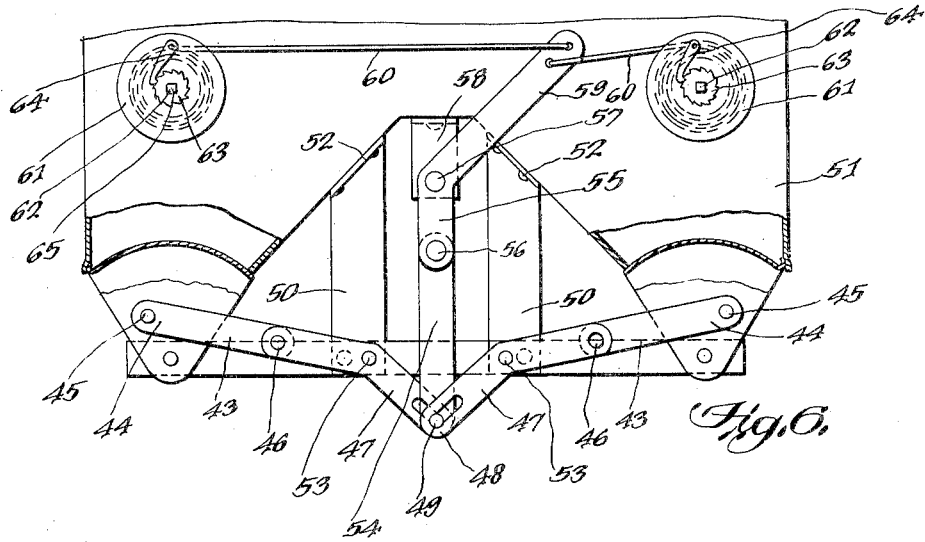
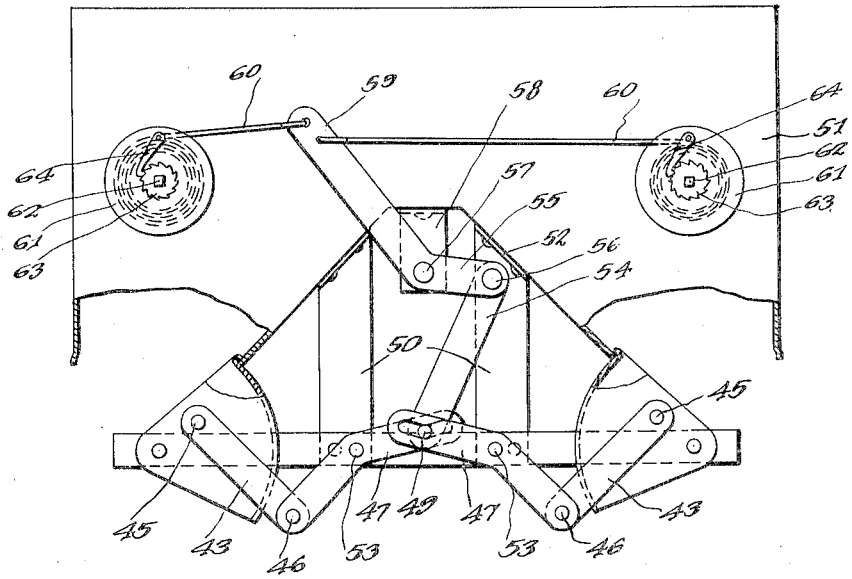
Omer D. Oliver
INVENTOR
BY Victor J. Evans
ATTORNEY Patented Mar. 26, 1929.

1,706,936

UNITED STATES PATENT OFFICE.

OMER D. OLIVER, OF GARY, INDIANA.

DUMP-CAR DOOR.

Application filed December 29, 1926. Serial No. 157,798.

This invention relates to certain novel improvements in dump car doors and has for its principal object the provision of an improved construction of this character which will be highly efficient in use and economical in manufacture.

Among the several objects of the invention is the provision of a dump car door of the character hereinafter described which is selectively constructed so as to effectively seal the door opening when the dump car door is in closed position.

A further object of the invention is the provision of a dump car door of the character hereinafter set forth which may be expeditiously operated for movement into and out of closed position.

Other objects will appear hereinafter.

The invention consists in the combination and arrangement of parts to be hereinafter described and claimed.

The invention will be best understood by reference to the accompanying drawings illustrating the preferred form of my invention, and in which:

Fig. 1 is a fragmentary side elevational view of the invention showing certain parts thereof in section, Fig. 2 is a fragmentary side elevational view of a modified form of construction showing certain parts thereof in section, Fig. 3 is a fragmentary sectional detail view taken substantially on line 3—3 of Fig. 2, Fig. 4 is a fragmentary vertical sectional detail view of the invention showing a still further modified form of construction, Fig. 5 is a fragmentary sectional detail view taken substantially on line 5—5 of Fig. 4, Fig. 6 is a fragmentary side elevational view of the invention showing a still further modified form of construction, and Fig. 7 is a side elevational view similar to that illustrated in Fig. 6 showing the dump car doors in an open position.

Referring particularly to Fig. 1, 10 indicates a car body which has transverse inclined partitions 11 to provide, together with other inclined walls 12 of the car body, opposite hoppers 13. The walls 11 have at their lower end portions openings 14 which permit the exit of material from within the car body 10.

The doors for closing these openings are formed substantially U-shaped to provide bight portions 15, which, under certain conditions, close the openings 14. The limb portions 16 of these doors are pivotally connected as at 17 to depending portions 18 of the car body. The edge portion 19 of each of the doors is adapted to flatly engage in a seat 20 formed in a plate 21 secured to the inclined walls 12 as at 22. The seat cooperates with the edge portion 19 to provide a seal to prevent escape of material from within the car body.

Means is provided for manually moving the doors into closed position. This means includes link members 24 having corresponding end portions pivotally connected as at 25 to the doors and opposite corresponding end portions pivotally connected as at 26 to operating links 27. These operating links 27 have their outer end portions connected for operation with operating shafts 28. Each of these operating shafts 28 has an end portion 29 substantially square in cross section for the reception of a suitable tool which is used to rotate the shafts. On each of the shafts is mounted a ratchet wheel 30 adapted to be engaged by a lock pawl 31 which is pivotally supported as at 32 to the car body 10. These lock pawls function to retain the doors in open position to permit exit of the material from within the car body 10.

From the above description it will be evident that I provide a dump car door for closing the car opening which will effectively seal the opening to prevent accidental exit of material from the car body and when the door is closed it is retained in such position by the weight of material within the car body.

In Fig. 2 I have illustrated my dump car doors associated with a flat bottom car 33. In this form of construction it will be seen that when the doors are in closed position the edge portion 34 of the door will engage a seat provided by a plate 36 secured to the floor 35 of the car body and provide an effective seal. When the doors are moved from closed position they are limited in their movement by stops 36'.

It will be seen that the bight portions of the doors when the doors are in closed position, are disposed in alignment with the upper surface of the car body floor 37'. Secured to the edge 38' defining the door openings are plates 39' which engage the peripheral edge of the bight portions of the doors and cooperate to provide an effective seal.

The means for moving these doors from and into closed position includes a rack bar 37 which is carried by one of the limb portions 38 of each of the doors. This rack 37 has meshing relation with a pinion 39 carried by the operating shaft 28.

In Figs. 4 and 5 I have illustrated a slightly modified form of construction wherein it will be hereinafter noted that the door transversely spans the car body 40 to close the door opening. In this connection it will be seen that the sealing flange 20 is mounted on the adjacent side wall 41 of the car body 40 and when the door is in closed position the sealing flange will be engaged thereby to support the door in this position.

In this form of construction the operating shaft 28, with its ratchet wheel 30 and the pawl 31, is supported by depending plates 31' suspended from the car body 40.

In Figs. 6 and 7 I have illustrated a selective means for moving, simultaneously, the doors from and into closed position and in this connection I provide link members 43 which have corresponding end portions 44 pivotally connected to adjacent portions of the doors as at 45. The other end portions of these links 43 are pivotally connected as at 46 to operating links 47 which are pivotally connected at their outer ends 48 by a slot and pin connection 49. These operating links are pivotally connected to depending plates 50 suspended from the car body 51 as at 52 through the medium of suitable pintles 53. The pin of the pin and slot connection 49 is connected to a connecting link 54 which has its upper end portion connected to an operating lever 55 as at 56. This operating lever 55 is pivotally connected as at 57 to a depending plate 58. The upper end portion 59 of the operating lever is connected by means of a cable 60 to a drum 61. This drum 61 is fixed to a shaft 62 which carries a ratchet wheel 63 adapted to be engaged by a pawl 64. The shaft 62 has a square shaped end portion 65 for the reception of a suitable turning tool.

Upon rotating the shaft 62 the drum 61 will be rotated in a direction to wind the cable 60 thereon and as this cable is wound on the drum the operating lever 55 will be pivoted about its pivot 57 and impart pivotal movement to the connecting links 47. This pivotal movement of the connecting links 47 will act upon the links 43 and pivot the doors from closed position to dispose the sealing flanges 20 upon the inclined walls 11.

By reverse rotation of the drum the weight of the links 47 and 54 will cause the links 47 to act upon the links 43 and pivot the doors back into closed position with the sealing flange disposed in bearing relation with the adjacent side walls of the car body.

While I have illustrated and described the preferred form of construction for carrying my invention into effect, this is capable of variation and modification without departing from the spirit of the invention. I, therefore, do not want to be limited to the precise details of construction set forth but desire to avail myself of such variations and modifications as come within the scope of the appended claims.

Having thus described my invention, what I claim as new and desire to secure by Letters Patent is:

1. The combination with a car body having a door opening formed therein, of a sealing strip at one side of said door opening, a door for said opening, said door having a central portion adapted to close said opening and an edge portion adapted to engage the sealing strip, a second strip at the opposite side of said door opening and having a lower edge portion adapted for rubbing engagement with said central portion, and means providing pivotal connection between said door and said car body.

2. The combination with a car body having a door opening formed therein, of a sealing strip at one side of said door opening, a door for said opening, said door having a central portion adapted to close said opening and an edge portion adapted to engage the sealing strip, a second strip at the opposite side of said door opening and having a lower edge portion adapted for rubbing engagement with said central portion, a shaft providing pivotal connection between the ends of the door and the car body, said shaft being centrally located with respect to the door opening whereby weight applied to the central portion of the door will bear the door against said shaft.

In testimony whereof I affix my signature.

OMER D. OLIVER.